Aug. 27, 1957   R. J. ROBBINS   2,804,539
SAFETY LIGHT FOR TRAILERS, TRUCKS, AND THE LIKE
Filed March 30, 1956
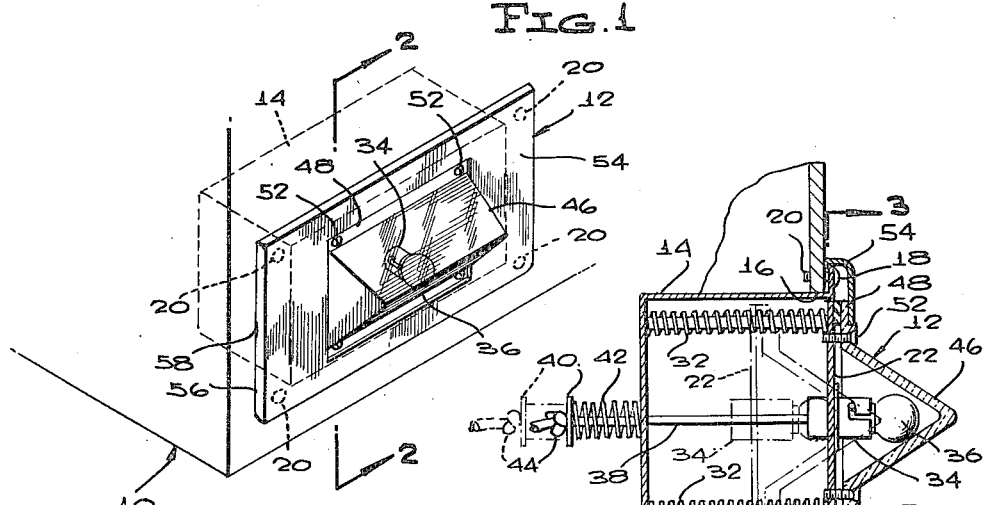
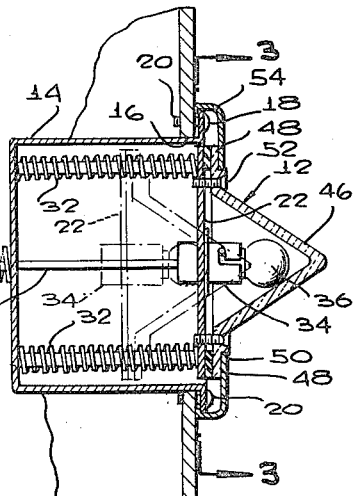
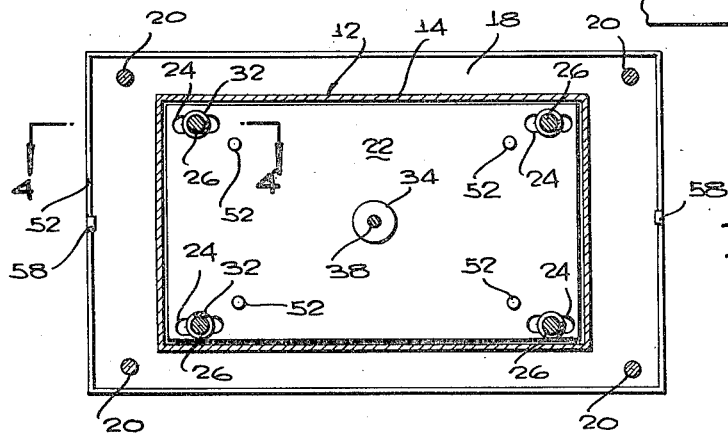
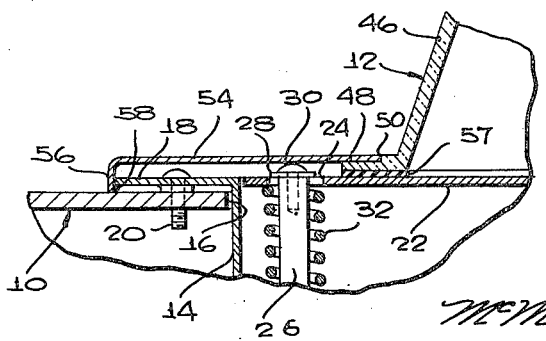
INVENTOR.
ROBERT J. ROBBINS
BY
McMorrow, Berman & Davidson
ATTORNEYS

United States Patent Office 2,804,539
Patented Aug. 27, 1957

2,804,539

SAFETY LIGHT FOR TRAILERS, TRUCKS, AND THE LIKE

Robert J. Robbins, Lowell, Ind.

Application March 30, 1956, Serial No. 575,192

2 Claims. (Cl. 240—7.1)

This invention relates to lights for trailer or truck bodies, or for other vehicles, such as tail lights, and more particularly has reference to a mounting for a light or lamp of this nature so designed as to permit the mounting to yield under any pressure exerted thereagainst and retract within the truck or trailer body, so that it will not break when said pressure occurs.

In many instances, trailer or truck lamps of this nature are broken when, for example, the vehicle is being backed up and the tail light or other lamp strikes an object. The breakage results from the fact that the lamps are conventionally mounted in such a way that they will not yield under said pressure and breakage naturally occurs when the pressure becomes too great.

In view of the above, the main object of the present invention is to provide a light or lamp mount that will be recessed in the vehicle body, and will be spring biased outwardly of the vehicle body, with the outward movement being prevented by a stop in the form of a surrounding trim plate, through an opening in which the lens of the lamp projects. Should an object strike the lens or should other pressure be exerted thereagainst, the lens will retract in the recess provided therefor, against the restraint of the spring, so that breakage of the lens or of other parts of the device will not occur.

An important object of the present invention, in this regard, is to provide a device of the nature referred to which will be a self-contained assembly, so that upon attachment by screws or equivalent fastening elements to the truck body, the entire device will be mounted operatively, ready for use and in a position such that it will automatically yield under pressure exerted thereagainst.

Another object of importance is to provide a device as stated which will be characterized by the simplicity of its design, so that it can be manufactured at relatively low cost.

Another object of importance is to provide a lamp mount of the character described which, despite the automatically retractile characteristics thereof, will nevertheless be so disposed that the lens thereof will project a substantial distance beyond the surface of the vehicle body, so that it can be seen from a substantial number of directions.

Still another object is to provide a device of the nature described, wherein the electrical connections to the lamp can be effected with ease, despite the yieldable mounting of the lamp.

Other objects will appear from the following description, the claims appended thereto, and from the annexed drawing, in which like reference characters designate like parts throughout the several views, and wherein:

Figure 1 is a perspective view of a lamp mount formed according to the present invention, mounted in a vehicle body only a portion of which is shown;

Figure 2 is a sectional view, on an enlarged scale, on line 2—2 of Figure 1;

Figure 3 is an enlarged sectional view, the scale being enlarged above that of Figure 2, taken on line 3—3 of Figure 2; and Figure 4 is a detail sectional view, the scale being enlarged above that of Figure 3, taken on line 4—4 of Figure 3.

Referring to the drawings in detail, designated generally at 10, 12 are a vehicle body and the lamp constituting the present invention, respectively. The vehicle body may be that of a trailer, but alternatively, can be a truck or automobile body. In any event, the lighting device constituting the invention includes a rectangular housing 14 closed at its back but fully open at its front, the front portion of the housing engaging snugly in a rectangular opening 16 formed in the vehicle body.

Integrally formed upon the front portion of the housing is a peripheral flange 18, projecting laterally outwardly from the associated side walls of the housing 14, so as to overlie the edge portion of the opening 16. As shown in Figure 3, the flange 18 is somewhat greater in width at the opposite sides of the housing, than it is at the top and bottom of the housing.

Extending through corner openings of the flanges 18, and threaded in registering openings formed in the vehicle body, are mounting screws 20, whereby the housing 14 is fixedly connected to the vehicle body with its open front in the general plane of the wall in which the housing is mounted, and with the remainder of the housing recessed wholly within the vehicle body.

Within the housing, and normally disposed in the open front of the housing, is a flat, rectangular lamp support plate 22, having at its several corners elongated apertures 24, through which extend guide posts 26 having inner or rear ends fixedly connected to the back wall of the housing 14.

The front ends of the posts 26 extend through the apertures 24, and positioned against said front ends of the posts are washers 28, secured to the posts by screws 30 threaded in axial openings of the posts (Figure 4). A coiled compression spring 32 is circumposed about each post, abutting at its opposite ends against the plate 22 and the back wall of the housing respectively.

By reason of this arrangement, the springs 32, tending to expand, shift the plate 22 to the normal position shown in Figure 2, at which time the plate 22 is in the general plane of the open front of the housing. Further movement of the plate 22 to the right in Figure 2 is prevented by the washers 28, which are engaged by the plate 22 and thus constitute stops limiting the outward movement of the plate.

Mounted in a center opening of plate 22 and projecting forwardly from the plate is a conventional lamp socket 34, in which is engaged a lamp 36. To one terminal of the lamp socket there extends a cord 38, projecting through a center opening formed in the back wall of the housing. Exteriorly of the housing, the cord or lead wire 38 receives a washer 40, and a coil spring 42 is circumposed about the cord 38 and is held under compression between the back wall of the housing and the washer 40. The washer 40 is engaged against a knot 44 formed in the cord.

It will be understood that the cord extends from a source of electricity such as a vehicle battery, and the circuit through the lamp is completed by reason of the fact that the other terminal of the lamp cylinder 34 is connected to ground.

The purpose of the spring 42 is to hold the wire 38 in a taut condition, so that when the plate 22 is pushed back within the housing 14 to the dotted line position shown in Figure 2, the cord 38 will not loop or flex under conditions that would tend to affect adversely the rearward movement of the plate 22 or, alternatively, cause fraying of the insulation material surrounding the lead.

In other words, when plate 22 is pushed back within the housing against the restraint of the springs 32, the springs 32 would be placed under compression, but at the same time the spring 42 which is normally under substantial compression expands, shifting the knot 44 to the dotted line position in Figure 2, so that the cord 38 will always be kept taut. The force of the springs 32 is stronger than the force of the single spring 42, so that the tendency of the spring 42 to expand does not have the effect of overcoming the oppositely directed forces of the springs 32 that tend to hold the plate 22 in its normal full line position of Figure 2.

Protectively overlying the lamp 36 is a lens 46 which can be of any desired color, and in the illustrated embodiment said lens is of triangular cross section with its apex portion projected forwardly beyond the adjacent wall of the vehicle body. Formed upon the lens is a peripheral flange 48, reduced in thickness at its margin to define a recess 50 on the front face of the flange 48. In the top and bottom portions of the flange, adjacent opposite ends of the lens, there are formed openings receiving screws 52 threaded into registering openings provided in the plate 22.

Surrounding the lens is a face plate 54, having a rearwardly directed peripheral flange 56, bearing against the wall of the vehicle body. The face plate is proportioned to cover the flange 18 of the housing, and has a center opening receiving the lens. The inner peripheral portion of the face plate 54 seats in the recess 50 as shown in Figures 2 and 4, and a rubber gasket 57 is interposed between the plate 22 and the flange 48 of the lens 46. The gasket can be cemented on the opposite faces thereof to the flange 48 and plate 42, but in any event is held under compression between the flange and plate by the drawing of said flange and plate together through the means of the screw 52.

At its opposite ends, the face plate 54 is formed with inwardly directed spring lugs 58, provided upon the flange 56 (Figures 3 and 4) and these are adapted to snap in place in back of the flange 18.

By reason of the construction illustrated and described, it will be seen that normally, the plate 22, lamp 36 and lens or cover glass 46 will be disposed in the position shown in full lines in Figure 2, but in the event a pressure is directed against the cover glass toward the left in Figures 1 and 2, the springs 32 will compress, with the glass, lamp, and plate 22 moving inwardly within the housing 14. Yielding of the lamp mount under pressure in this manner prevents breakage, and it will be seen that as soon as the pressure is relieved, the springs 32 will expand, so as to shift the lens 46 outwardly through the center opening of the face plate 54, back to the normal position of the parts.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. In a lamp device for installation in an opening of a wall, a housing adapted to be fixedly mounted within said opening and having an open front; a plurality of guide posts within said housing extending between the back wall and the open front of the housing; a lamp support plate slidably mounted upon said guide posts for movement toward and away from the back of the housing, said posts including stops limiting movement of the plate away from the back of the housing beyond a position in which the plate is in the general plane of the open front of the housing; resilient, yielding means circumposed about the guide posts and tensioned to normally bias the plate to said position; lamp means carried by the plate; a cover glass for the lamp means secured to the plate and projecting beyond the open front of the housing, whereby, on exertion of pressure against said cover glass the glass, lamp means, and plate will be bodily shifted toward the back wall of the housing against the restraint of said resilient, yielding means; an electrical conductor extending from said lamp means rearwardly from the lamp support plate within the housing and projecting out of and beyond the back wall of the housing; and resilient yielding means operatively connected to the projecting portion of said conductor for maintaining the conductor in taut condition.

2. In a lamp device for installation in an opening formed in a wall, a housing adapted to be fixedly mounted in said opening in a position recessed within the wall, said housing being formed with an open front; a plurality of guide posts mounted within the housing, the housing having a back wall and said posts extending between the back wall and the open front of the housing; a lamp support plate slidably mounted upon the several posts, the posts including stops limiting slidable movement of the lamp support plate in a direction away from the back wall of the housing beyond a position in which the lamp support plate is in the general plane of the open front of the housing; resilient, yielding means within the housing extending into engagement with the lamp support plate and tensioned to bias the lamp support plate to said position; a lamp socket carried by the lamp support plate; a lamp within said socket projecting forwardly from the lamp support plate beyond said open front of the housing when the lamp support plate is in said position; an electrical conductor extending from said socket rearwardly from the lamp support plate within the housing, said conductor projecting beyond the back wall of the housing and including an abutment exteriorly of the housing; resilient, yielding means interposed between said abutment and the back wall of the housing and circumposed about the conductor, whereby, on shifting of the lamp support plate toward the back wall of the housing against restraint of said first named resilient, yielding means the second named resilient, yielding means will expand to maintain the conductor in a taut condition; a cover glass secured to the lamp support plate and projecting forwardly therefrom in overlying relation to said lamp; and a face plate connected to the housing and having a center opening through which said cover glass projects.

References Cited in the file of this patent

UNITED STATES PATENTS

| | | |
|---|---|---|
| 2,571,130 | Hargis | Oct. 16, 1951 |
| 2,731,544 | Kayser | Jan. 17, 1956 |
| 2,781,443 | Cargle | Feb. 12, 1957 |